Patented Feb. 22, 1944

2,342,332

UNITED STATES PATENT OFFICE 2,342,332

DITHIOCARBAMIC ACID DERIVATIVE

Russell T. Dean, Stamford, Conn., assignor to American Cyanamid Company, New York, N. Y., a corporation of Maine No Drawing. Application December 30, 1941, Serial No. 424,921

8 Claims. (Cl. 260—429)

This invention relates to a class of new chemical compounds and more particularly to derivatives of dithiocarbamic acid.

The dithiocarbamates of the invention are characterized by the presence of substituent ether groups on alkyl radicals attached to the nitrogen atom of the dithiocarbamic acid molecule. The compounds may be represented by the formula

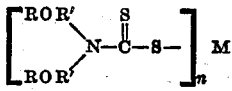

wherein R may be an alkyl, aralkyl or aryl group which may be the same or different. The alkyl group may be acyclic or cyclic. These radicals may contain substituents which do not change the essential character of the compound such as halogen atoms, nitro groups, hydroxy groups, etc. R' is an alkylene group which separates the oxygen atom from the nitrogen atom by at least two carbon atoms. This group may contain substituents of the kind described above in respect to the groups represented by R as well as aryl and substituted aryl radicals. R' may represent like or unlike alkylene radicals. M is a salt-forming group or an organic radical and $n$ is the valence of M.

In the above formula, M may be a heavy metal such as zinc, cadmium and lead, an alkali metal such as sodium and potassium or an alkaline earth metal such as calcium, barium and magnesium. It may be the ammonium radical or a salt forming group derived from the organic nitrogen bases such as a substituted ammonium group derived from the alkyl, aralkyl, aryl and heterocyclic amines, a guanidinium group derived from guanidine, diphenyl guanidine, diorthotolyl guanidine, a pyridinium group, etc. Where M is an organic radical, it may be an ester-forming group which may be alkyl, aralkyl or aryl. Further, it may be a complex organic radical containing carbon, hydrogen, sulfur, oxygen or nitrogen for example, the group

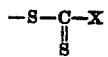

or the group

wherein X represents an organic radical which may be the group

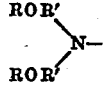

in which case the resulting compounds are respectively the thiuram disulfides and thiuram monosulfides derived from the parent ether substituted amines.

The dithiocarbamic acid derivatives of the invention may be prepared by methods known to the art for the preparation of similar derivatives of similar dithiocarbamic acids. The various dithiocarbamic acids may be prepared in the form of their sodium salts by reaction of carbon disulfide, a secondary amine and sodium hydroxide in the presence of a suitable solvent. By employing ammonium hydroxide in place of the sodium hydroxide in this reaction, the corresponding ammonium dithiocarbamates may be prepared. By employing the sodium dithiocarbamate from the above reaction as one component of a double decomposition reaction, various other metal salts and organic nitrogen base salts of the dithiocarbamic acid may be obtained by the addition to a solution of the sodium dithiocarbamate of a salt of the desired metal or organic nitrogen base, e. g., the chloride or the hydrochloride respectively. As will be understood by those skilled in the art, the solvent employed in this double decomposition reaction should be preferably so selected that it is a solvent for only one of the reaction products, thus providing for selective separation of the same. where the salt prepared is the dithiocarbamic acid salt of an organic nitrogen base, the solution containing the same may be concentrated under reduced pressure and the residue dried in vacuo to obtain the salt in its anhydrous form.

Any of the various salt-forming organic nitrogen bases can be employed in the foregoing manner for the preparation of dithiocarbamates coming within the scope of the invention, among which bases may be mentioned, for example:

| | |
|---|---|
| Methyl amine | Aniline |
| Dimethyl amine | N-ethyl aniline |
| Trimethyl amine | N-cyclohexyl aniline |
| Dibutyl amine | Toluidine |
| Cyclohexyl amine | Pyridine |
| Dicyclohexyl amine | Piperidine |
| Ethanolamine | Ditetrahydrofurfuryl amine |
| Diethanolamine | Morpholine |

The parent secondary amine salts of the dithiocarbamic acids are preferably prepared by reaction in known manner between one mol of carbon disulfide and two mols of the secondary amine, water or other suitable solvent being employed in the reaction. The amine salts are more specifically claimed in application Ser. No. 425,235, now Patent No. 2,302,749, issued November 24, 1942.

The thiuram disulfides may be conveniently prepared by the oxidation of the sodium dithiocarbamate in aqueous solution with hydrogen peroxide containing sufficient sulfuric acid to neutralize the sodium hydroxide formed. The thiuram monosulfides may be prepared from the thiuram disulfides by desulfurizing the thiuram disulfide in alcoholic solution with a molecular equivalent of potassium cyanide.

The esters or other organic derivatives of the dithiocarbamic acids may be prepared by reaction of the sodium dithiocarbamate with a reactive halogen-containing compound such as ethyl bromide, benzoyl chloride, phosgene, acetyl chloride, benzyl chloride, chloracetone, carbamyl chloride, dimethyl carbamyl chloride, ethyl tolyl carbamyl chloride, diphenyl carbamyl chloride, dinitrochlorbenzene, picryl chloride, benzal chloride, ethyl chloracetate, ethyl dichloracetate, chloracetamide.

The invention is illustrated by the following examples of the preparation of derivatives of the dithiocarbamic acids to which, however, the invention is not to be restricted.

The secondary amines which may be employed for the preparation of the dithiocarbamates of the present invention have the formula

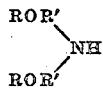

wherein R and R' represents radicals identical with those described in the above general formula. Examples of the secondary amines are Bis (2-methoxy ethyl) amine
Bis (2-ethoxy-n-butyl) amine
Bis (2-ethoxy-n-amyl) amine
Bis (2-ethoxy-n-hexyl) amine
Bis (2-ethoxy-(3'-methyl amyl)) amine
Bis (2-ethoxy-2-benzyl ethyl) amine
Bis (2-ethoxy-2-phenylethyl) amine
Bis (2-phenoxy ethyl) amine
Bis (2-β-naphthoxy ethyl) amine
Bis (2-p-methylphenoxy ethyl) amine
Bis (3-methoxy-n-propyl) amine
Bis (3-ethoxy-n-propyl) amine
Bis (3-isopropoxy-n-propyl) amine
Bis (3-n-butoxy-n-propyl) amine
Bis (3-(2'-ethylhexoxy)n-propyl) amine
Bis (3-octadecoxy-n-propyl) amine
Bis (3-phenoxy-n-propyl) amine
Bis (3-cyclohexoxy-n-propyl) amine
Bis (4-phenoxy-n-butyl) amine
Bis (3-(2'-ethoxyethoxy)-n-propyl) amine
Bis (3-(2'-ethylhexoxy)-isobutyl) amine

EXAMPLE 1

*Zinc bis (3-ethoxy propyl) dithiocarbamate*

840 grams of 95% sodium hydroxide (20 mols) were dissolved in 16 liters of water and cooled to 17° C. by the addition of cracked ice. 3780 grams of bis (3-ethoxy propyl) amine (20 mols) were added and the mixture cooled to 17° C. 1520 grams of carbon disulfide (20 mols) were then added slowly with good stirring and the reaction mixture kept below 20° C. When the unreacted carbon disulfide was no longer perceptible, the solution containing the sodium dithiocarbamate was clarified and then cooled to 10° C. by the addition of cracked ice. The zinc salt was formed by slowly adding to the solution of the sodium salt, with good stirring, 1435 grams of 95% zinc chloride (10 mols) in eight liters of cold water. The zinc salt precipitated immediately and crystallization was aided by seeding with a previously prepared sample of the same material. The addition took about one half hour following which the mixture was stirred for an additional half hour and then filtered. The product was thoroughly washed with water, reslurried in ten liters of water, filtered and again washed with water, and dried for 25 hours at 40° C. The product, zinc bis (3-ethoxy propyl) dithiocarbamate, was a fine white powder with a melting point of 66–69° C. The analysis for zinc gave a value of 11.37% as compared to a theoretical value of 10.96%.

EXAMPLE 2

*Sodium bis (3-ethoxy propyl) dithiocarbamate*

66 grams of bis (3-ethoxy propyl) amine and 28 grams of 50% sodium hydroxide were dissolved in 80 cc. of water and cooled to 5° C. 26.5 grams of carbon disulfide were added slowly with good stirring and the temperature of the reaction mixture kept below 25° C. When the carbon disulfide was no longer perceptible the solution was clarified. A solution of sodium bis (3-ethoxy propyl) dithiocarbamate of 50% concentration was thus obtained. The anhydrous form of the sodium salt may be obtained by concentrating the solution under reduced pressure and drying the residue in vacuo over concentrated sulfuric acid. The anhydrous product is a viscous balsam.

EXAMPLE 3

*Bis (3-ethoxy propyl) ammonium bis (3-ethoxy propyl) dithiocarbamate*

84 grams of bis (3-ethoxy propyl) amine were dissolved in 100 cc. of water and cooled to 5° C. 17 grams of carbon disulfide were added in small portions and the mixture well-stirred until clear, the temperature of the reaction mixture being kept below 25° C. The product was a 50% solution of the amine salt. The anhydrous form of the amine salt may be obtained by concentrating the solution under reduced pressure and drying the residue in vacuo over concentrated sulfuric acid. The anhydrous product is an orange balsam.

EXAMPLE 4

*Tetrakis (3-methoxy propyl) thiuram disulfide*

A solution of 81 grams of bis (3-methoxy propyl) amine in 200 cc. of water was cooled to 10° C. and 38 grams of carbon disulfide gradually added thereto. A cold solution of 20 grams of sodium hydroxide in 100 cc. of water was then added with good stirring. The temperature of the reaction mixture was kept below 10° C. After the liquid mixture became clear (one hour) its volume was increased to one liter by the addition of cold water and the resulting solution clarified. To this solution was added a cold mixture of 29 grams of 30% hydrogen peroxide, 109 grams of 22% sulphuric acid and 300 cc. of water over a period of one hour. The product separated as a light yellow oil which was washed well with water and desiccated in vacuo over concentrated sulphuric acid.

The product analyzed nitrogen 5.94% and sulfur 26.75% as compared with the theoretical values of 5.93% and 27.11% respectively.

EXAMPLE 5

*Tetrakis (3-methoxy propyl) thiuram monosulfide*

A mixture of 47 grams of tetrakis (3-methoxy propyl) thiuram disulfide, 6.5 grams of potassium cyanide and 200 cc. of ethyl alcohol was stirred at 45–50° C. for 2½ hours. The reaction mixture was clarified and evaporated to half volume under reduced pressure. At this point a solid believed to be potassium thiocyanate was filtered off and the evaporation completed. The resulting thick liquid was well-washed with water and desiccated in vacuo over concentrated sulphuric acid. The product was obtained as a dark red oil which was soluble in alcohol and ether but insoluble in water.

The product analyzed 6.30% nitrogen and 21.40% sulfur as compared to the theoretical of 6.36% and 21.82% respectively.

Example 6

2,4 Dinitrophenyl bis (3-methoxy propyl) dithiocarbamate

A solution of sodium bis (3-methoxy propyl) dithiocarbamate was prepared by the interaction of 16 grams of bis (3-methoxy propyl) amine, 8 grams of carbon disulfide and 4 grams of sodium hydroxide in 275 cc. of ethanol at 25° C. It was clarified and heated to 50° C. A solution of 2,4 dinitrochlorbenzene in 200 cc. of ethanol was added dropwise with stirring over a period of ½ hour, the temperature being maintained at 45–55° C. After the reaction was complete, the solid which was believed to be sodium chloride was filtered off and the mother liquor evaporated to small volume under reduced pressure. The oil which separated was taken up in ether, and the ether solution washed with water and dried over anhydrous sodium sulphate. Removal of the ether in the usual manner gave the product in the form of a dark, viscous oil.

The preceding examples are intended primarily by way of illustration. Other derivatives of dithiocarbamic acid falling within the scope of the invention can be prepared in a similar manner, for example, Zinc bis (2-methoxy ethyl) dithiocarbamate
Zinc bis (3-methoxy propyl) dithiocarbamate
Zinc bis (3-ethoxy propyl) dithiocarbamate
Zinc bis (3-isopropoxy propyl) dithiocarbamate
Zinc bis (3-n-butoxy propyl) dithiocarbamate
Zinc bis (3(2'-ethyl hexoxy) propyl) dithiocarbamate
Zinc bis (3-n-octadecoxy propyl) dithiocarbamate
Lead bis (3-methoxy propyl) dithiocarbamate
Lead bis (3-ethoxy-propyl) dithiocarbamate
Cadmium bis (3-methoxy propyl) dithiocarbamate
Cadmium bis (3-ethoxy-propyl) dithiocarbamate
Magnesium bis (3-methoxy propyl) dithiocarbamate
Barium bis (3-methoxy propyl) dithiocarbamate
Calcium bis (3-methoxy propyl) dithiocarbamate
Bis (2-methoxy ethyl) ammonium bis (2-methoxy ethyl) dithiocarbamate
Bis (3-methoxy propyl) ammonium bis (3-methoxy propyl) dithiocarbamate
Sodium bis (3-isopropoxy propyl) dithiocarbamate
Guanidinium bis (3-isopropoxy propyl) dithiocarbamate
Diorthotolyl guanidinium bis (3-methoxy propyl) dithiocarbamate In general, the compounds of the invention have good solubility in rubber and are accelerators of the vulcanization of rubber. For the most part, they are accelerators of the ultra type and therefore more suitable for the vulcanization of latex.

While I have described certain specific embodiments of my invention, it is to be understood that the invention is not to be limited thereto but it is to be restricted solely by the scope of the appended claims construed as broadly as is permissible in view of the prior art.

I claim:

1. A dithiocarbamic acid derivative having the formula

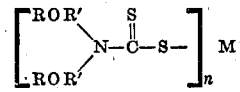

wherein R is a radical selected from the group consisting of alkyl, aralkyl and aryl radicals, R' is an alkylene radical which separates the oxygen atom from the nitrogen atom by at least two carbon atoms, M is a metal and $n$ is the valence of M.

2. A dithiocarbamic acid derivative having the formula

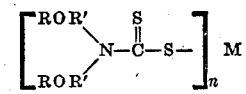

wherein R is an alkyl radical and R' is an alkylene radical which separates the oxygen atom from the nitrogen atom by at least two carbon atoms, M is a metal and $n$ is the valence of M.

3. A dithiocarbamic acid derivative having the formula

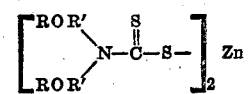

wherein R is an alkyl radical and R' is an alkylene radical which separates the oxygen atom from the nitrogen atom by at least two carbon atoms.

4. Zinc bis (2-methoxyethyl) dithiocarbamate.

5. Zinc bis (3-ethoxypropyl) dithiocarbamate.

6. A dithiocarbamic acid derivative having the formula

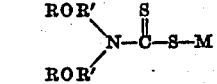

wherein R is an alkyl radical and R' is an alkylene radical which separates the oxygen atom from the nitrogen atom by at least two carbon atoms and M is an alkali metal.

7. A dithiocarbamic acid derivative having the formula

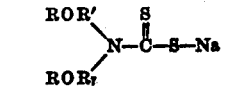

wherein R is an alkyl radical and R' is an alkylene radical which separates the oxygen atom from the nitrogen atom by at least two carbon atoms.

8. Sodium bis (3-ethoxypropyl) dithiocarbamate.

RUSSELL T. DEAN.